Figure 1:
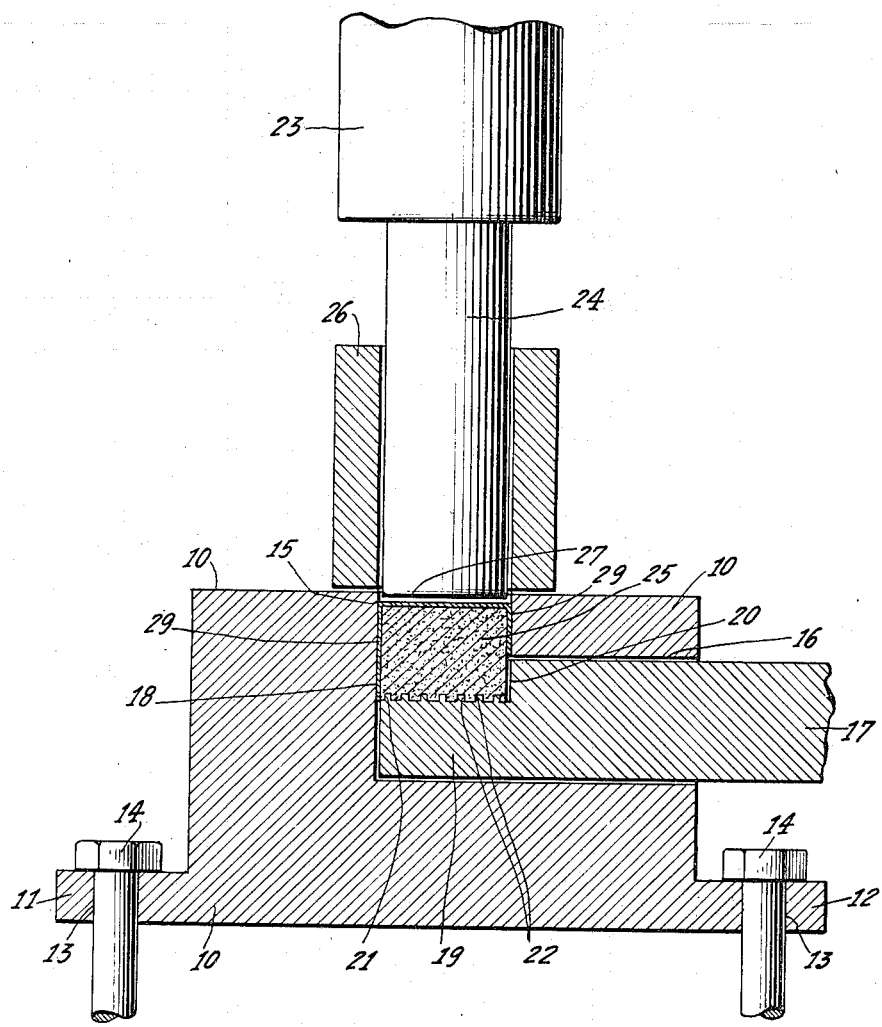

March 6, 1934. J. H. L. DE BATS 1,950,355
IMPROVED CUTTING AND FORMING TOOL AND WEARING SURFACE
Filed Jan. 16, 1932 2 Sheets-Sheet 2

INVENTOR
JEAN HUBERT LOUIS DE BATS.
BY Austin & Rip
ATTORNEYS

Patented Mar. 6, 1934

1,950,355

UNITED STATES PATENT OFFICE 1,950,355

IMPROVED CUTTING AND FORMING TOOL AND WEARING SURFACE

Jean Hubert Louis De Bats, East Orange, N. J.

Application January 16, 1932, Serial No. 587,084

5 Claims. (Cl. 29—95)

This invention relates to improvements in cutting tools and other wear and shock-resisting articles, and more particularly to a novel alloy composition and the method of preparing and applying the same as wear resistant surfaces for any machine tools or other apparatus.

Hitherto it has been proposed to prepare wear-resistant surfaces for cutting tools, dies, and the like, by mixing tungsten carbide or other like material, with a suitable bonding agent, such as copper, after which the so formed mass is configured to a desired shape, and the article sintered in a neutral atmosphere. This treatment causes shrinkage of the sintered article and the latter is required to be bonded to a tool or other article by means of a suitable braze or by welding. Such joints are notoriously weak and are not susceptible of giving desired impact or abrasion resistance; spalling and chipping of the sinter often occurring.

It is an object of this invention to provide an improved apparatus for applying wear-resistant alloy surfacings to cutting tools, dies, and other articles.

A further object of this invention is the provision of an improved wear-resistant article such as a cutting tool, die or other article having a wear resistant alloy surface associated therewith.

Yet another object of this invention is an improved process for applying a wear resisting material such as a carbide-metal alloy to a metallic surface under the combined influences of heat and pressure.

A further object of this invention is the provision of such an improved process in which the carbide or equivalent wear resisting material is intimately associated with a metallic alloying agent, the mixture or "metal" initially reacted and plasticized, and then formed under the joint action of heat and pressure.

These and other desirable objects and advantages of the present invention will be described in the specification and illustrated in the drawings, a certain preferred embodiment being disclosed by way of example only, for, since the underlying principles may be incorporated in other specific construction, it is not intended to be limited to the ones shown and described, except as such limitations are clearly imposed by the appended claims.

Figure 2:
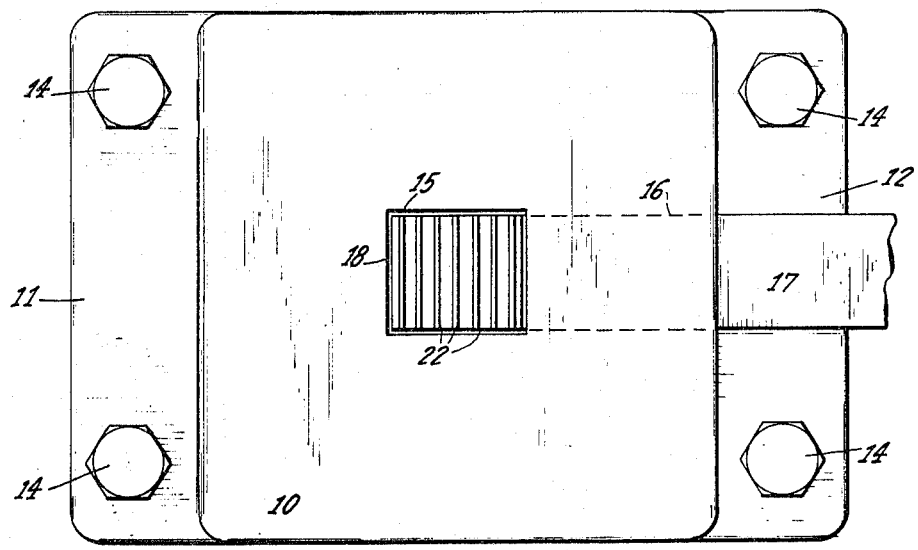
Figure 3:
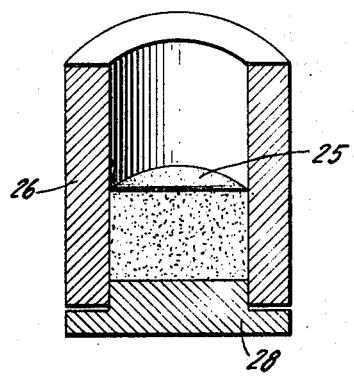

In the drawings, like numerals refer to similar parts throughout the several views, of which Fig. 1 is a vertical section through a die and associated plunger, a tool being shown in position;

Fig. 2 is a top plan view of the die shown in Fig. 1, a tool being shown in position therein, and Fig. 3 is a vertical section of a crucible showing the demountable bottom and a charge of material therein.

Broadly stated, the invention contemplates the application of tungsten carbide-metal and other wear-resisting alloys or carbides to the inside surfaces of dies, and to the contact points of cutting tools, and to wearing surfaces of other devices by the use of a hydraulic or mechanical press while such carbide-metal or wear resisting alloy is in a plastic reacting state under heat.

Under this process, the surface upon which the tungsten carbide-metal alloy or other like wear resisting material is to be applied preferably is milled out with ridges, serrations, grooves or other regular or irregular surface indentations and placed in a recess or die holder arranged with a punch or contact arrangement and the whole held firmly in a die mould. The tungsten carbide-metal alloy or wear resisting material is either originally heated and reacted and thereafter cast to approximately fill such recesses, or mounted or compressed into such form prior to being heated to plastic consistency. In either event, after the approximate amount of tungsten carbide-metal or other wear resisting alloy material or composition is heated to plasticity, it is placed within the recess and the punch engaged thereon for the purpose of comprising the plastic material into the die shapes and at the same time insuring the completion of the reaction between the several components of the material.

Under the heretofore known sintering and cementing processes of producing tungsten carbide material, the raw material is compacted by mechanical force in dies and is then sintered, without reaction, by heat applied in a neutral atmosphere. The present method differs therefrom in that the compression of the alloyed material is applied after the composite material has been heated to reaction and incipient plasticity, or after it has been first cast in a plastic state to the approximate size desired.

Although the invention is applicable to the combination of tungsten carbide-metal alloys and other carbide compositions and wear resisting alloys of every character, it is particularly described herein as applied to the use of tungsten carbide, tantalum carbide, and like wear resisting materials alloyed with suitable metals, by compression upon the wearing or other contact surfaces of an article or tool.

The method according to the invention herein causes, among other advantageous characteristics, an adherence of the tungsten carbide-metal alloy or equivalent materials to the surface desired in the same manner as though it were extruded thereon through any other method and, at the same time, eliminates the use of moulds for the extrusion or casting operation, as well as the well-known brazing process for tipping or mounting such dies or tools.

This method also applies to the manufacture of extrusion and drawing dies by compression between desired shaped surfaces of a punch and die set.

This method, including the compression feature, with accompanying liquefaction and complete reaction of the components of the material, as set forth in my application Serial No. 587,085, filed January 16, 1932, insures uniformity of the cutting or wearing surface and results in a closer cohesion of the molecular construction of the finished product.

A composition including tungsten carbide, tantalum carbide or any other suitable carbide reacted with a metal of the group comprising cobalt, iron, nickel or any other suitable alloying metal, in suitable proportions, is prepared by thoroughly mixing the materials together in powdered form, and either first melting them together in a crucible and casting into moulds or, as stated above, and more fully set forth and claimed in my application Serial No. 580,727, filed December 12, 1931, for Refractory metal compounds and process of making the same, by compressing suitable amounts of the material into approximate sizes of the articles desired, placing the latter in a crucible and heating to reaction and plasticity; that is, either a piece of the moulded metal or moulded material is placed in a crucible and heated to incipient plasticity in a suitable furnace whereby the components are initially reacted. It is then placed within the die mould and compressed to the shape of such mould and upon such surfaces as are desired, the compression of the so-reacted mass insuring completion of the reaction between the components.

The present invention eliminates the necessity for separate moulds and substitutes a single operation of forming the carbide alloy or other wear resisting metals to the desired shapes, upon the article with which it is to be associated.

Also, the present invention permits of the elimination of waste of appreciable amounts of the raw material, tungsten carbide or other wear resisting metals, which waste is now sustained in the casting and extruding methods.

In the accompanying drawings there is shown the die and punch, tool shank and carbide-metal alloy in one application. There is also shown a tool shank within the recess of the base of such a die. Variations of a die and mould shape for various other applications may also be prepared.

Referring more specifically to the drawings, the invention may be described with particular reference to an apparatus whose use permits the ready attainment of the results desired. The apparatus comprises generally a base portion 10, of any suitable heat resisting composition such as one or more of the high chromium alloys. This member is provided with flanges 11, 12, extending therebeyond, and suitably apertured, as indicated at 13, to receive bolts 14, or other means for attaching same to a suitable support.

The die block is provided with a top central well or depression 15, of any suitable configuration, and in communication with a horizontal slot or tool-receiving aperture 16, adapted to receive a tool 17, as will be described more in detail hereinafter. The openings 15 and 16, converge or combine to form a chamber 18, adapted to receive the cutting end 19 of the shank of a cutting tool. The end 19 of the tool support is stepped, as indicated at 20, to form a shoulder or platform 21. This latter is preferably provided with a plurality of serrations or ridges 22 of any desired configuration. The ridges 22 if desired may be mushroomed at their tops to provide an added anchorage for the cutting material intended to be applied thereto.

A plunger 23, having a nose 24, of any suitable configuration is adapted to slidingly fit the aperture 15 of the die, and to force the carbide-metal alloy or mixture 25 down out of the crucible 26, into contact with the cutting end 19 of the tool and to force the plastic material into engagement with the serrations or ridges 22 formed on the shoulder 21 of the tool. By suitably gauging the amount of alloy material 25, forced into the die aperture, the finished cutting edge metal may be pressed flush with the top of the tool, or if in slight excess may be ground to shape. In some instances it may be desirable to have an excess forming an extra free top surface.

By providing shims of metal of suitable gauge about the end 19, of the tool to be surfaced, the abrasive-metal alloy will be kept out of contact with the walls of the die chamber. The shims can be subsequently ground off when the tool is finished. The face 27 of the plunger or ram may also be suitably configured to give any desired cutting surface directly to the abrasive-metal composition, and thus minimize forming and dressing costs.

The crucible 26, which, as above intimated, may be configured to conform to the plunger nose 24, may be provided with a removable bottom 28, which is adapted to fit into the body of the crucible and seal the latter off. Owing to the highly viscous or semi-solid nature of the reacted material used under the conditions set forth when ready to be forced into place, the joint between the bottom closure and the body of the crucible does not have to be accurate.

In operation, the abrasive-metal mixture, comprising, for example, a powdered mixture of 90 parts tungsten carbide and 10 parts of an alloying metal of the group comprising nickel, cobalt, iron, or other metals having the desired characteristics, is placed, in appropriate amount, in a composite crucible, and the latter heated in a suitable furnace, to a temperature at which the metal begins to soften or get "slushy". Under these conditions the several components of the reaction mixture interact to form an alloy characterized in the cold condition to a matrix or liquidus of a tungsten carbide-metal reaction product in which the excess tungsten carbide has been thrown out of solution or crystallized. When this point is reached the crucible is removed from the furnace, inverted and placed under the plunger, and the bottom of the crucible removed. The plunger die is then operated. If desired, it is not always necessary to remove the crucible bottom.

Owing to the fact that the initial heating has been carried only to a state of incipient fusion, and not necessarily to a state of complete fusion and reacting, the mixture is very viscous and will not flow appreciably except under applied pressure. The viscous or semi-viscous mixture when flowed, under pressure, into contact with the tool or article with which it is to be associated, is thoroughly attached thereto, and is completely reacted, and due to the relatively high heat conductivity of the tool and the encompassing die structure, it is quickly chilled and assumes its desired form. By maintaining a suitable pressure on the cooling mass, the structures formed therefrom are annealed by their own heat, with resulting uniformity of crystalline structure of the reacted alloy mass, and are thus substantially free from danger of spalling or cracking due to inequalities in composition and tension, such as normally occur in most heterogeneous materials when quickly chilled or solidified from a plastic or molten condition.

The amount of reacting metal used, should only be such as to give the results desired for any particular use, as it is luminously obvious that different articles require different physical characteristics to be most efficient.

As intimated hereinabove, desirable results may be obtained by the use of shims 29 disposed around the walls 18 of the die and the bottom of the plunger 24. When pressure is applied, the shims, which may be of sheet steel of suitable thickness, are forced into contact with the plastic reacted alloy mass and prevent the latter from fusing or adhering to the die members. When the plastic mass 25 has cooled, the shims may be removed in any suitable manner, as by grinding.

While the invention has been described with reference to the direct application of the improved abrasive alloy to the tool or article which is to be surfaced, the invention also comprehends the use or application of an intermediate cement or bonding material, preferably a bonding metal applied to the tool before the latter is placed in the die and the surfacing applied thereto. Such a coating may comprise any of the well known materials of the type of spelter, brass, bronze or other well known soldering or brazing materials.

By the use of this invention, high carbide abrasive alloy surfaces made from 60 to 97 per cent carbide such as tungsten carbide, and 40 to 3 per cent of alloying metal of the group comprising cobalt, iron, nickel, may be made use of without introducing any of the undesirable characteristics normally obtaining with cemented or sintered materials, such as spalling and cracking under impact.

It will now be appreciated that there has been provided an improved method and apparatus for applying shock and wear resistant alloy surfacings to cutting tools, dies and other like structures, which method is characterized by extreme simplicity of operation and application and which results in the attainment of a substantially new product, namely a high carbide alloy cutting or wearing surface applied to a resilient shock absorbing shank or base.

This new product is found to be much greater in strength probably due to its alloy character, and its resiliency is found to have increased and thus there is less brittleness than in the prior products which may be used for the same purposes.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. A shock and wear resistant cutting tool, comprising, in combination, a shank having a shoulder formed at one end thereof, a plurality of ridges on said shoulder, a compressed, abrasive alloy on such shoulder in interlocking relation to said ridges and alloyed therewith, the said abrasive alloy comprising substantially 70 to 97 per cent of an abrasive material such as tungsten carbide reacted with a metal of the group comprising nickel, cobalt, iron.

2. A shock and wear resistant cutting tool, comprising, in combination, a shank having a shoulder formed at one end thereof, a plurality of ridges on said shoulder, a compressed, abrasive alloy on such shoulder in interlocking relation to said ridges and alloyed therewith, the said abrasive alloy comprising the reaction product of substantially 70 to 97 per cent tungsten carbide and 30 to 3 per sent cobalt.

3. An improved cutting tool comprising a shank portion, a shoulder at one end thereof, a plurality of mushroomed ridges formed on said shoulder and an abrasive alloy in interlocking relation with said ridges and alloyed therewith and forming a cutting surface for said tool, said alloy comprising the pressure reaction product of 70 to 97 per cent of an abrasive material such as tungsten carbide and an alloying metal of the group comprising nickel, cobalt, iron.

4. An improved composite product, comprising in combination, a body portion having machined ridges formed thereon, said ridges being mushroomed, and a facing of wear-resisting and cutting material forced onto said tool and in intimate locking contact with the mushroomed ridges under conditions adapted to permit the alloying of the cutting material with the said ridges, the said facing comprising an alloy composition containing from 60 to 97 per cent of a component high in carbides pressure-reacted with 3 to 40 per cent of a metal material.

5. A shock and wear resistant cutting tool, comprising, in combination, a shank having a shoulder formed at one end thereof, a compressed, abrasive alloy on said shoulder and alloyed therewith, the said abrasive alloy comprising substantially 70 to 97 per cent of an abrasive material, such as tungsten carbide reacted with a metal of the group comprising nickel, cobalt and iron.

JEAN HUBERT LOUIS DE BATS.